Dec. 5, 1950     J. R. HAYWARD     2,532,303
APPARATUS FOR MAKING FINNED TUBE HEAT EXCHANGERS
Original Filed Nov. 29, 1945     3 Sheets-Sheet 2

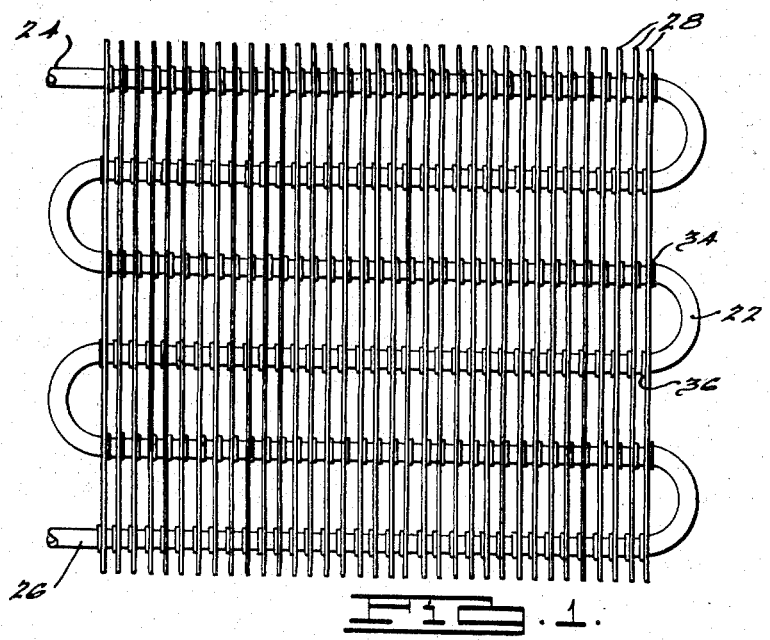
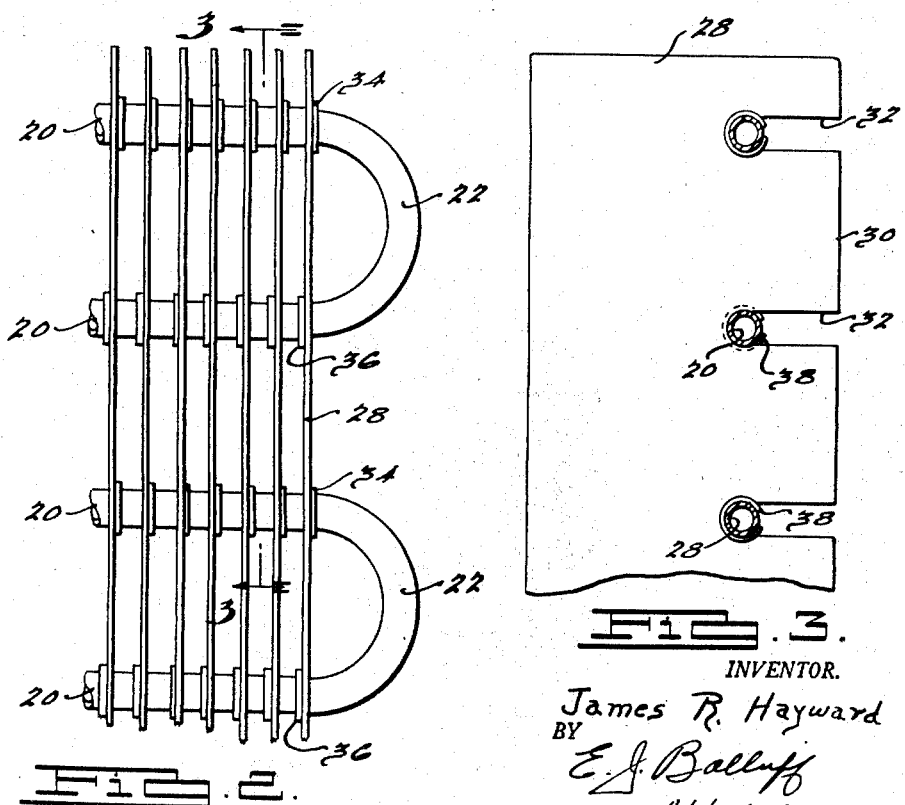

INVENTOR.
James R. Hayward
BY
E. J. Balluff
Attorney

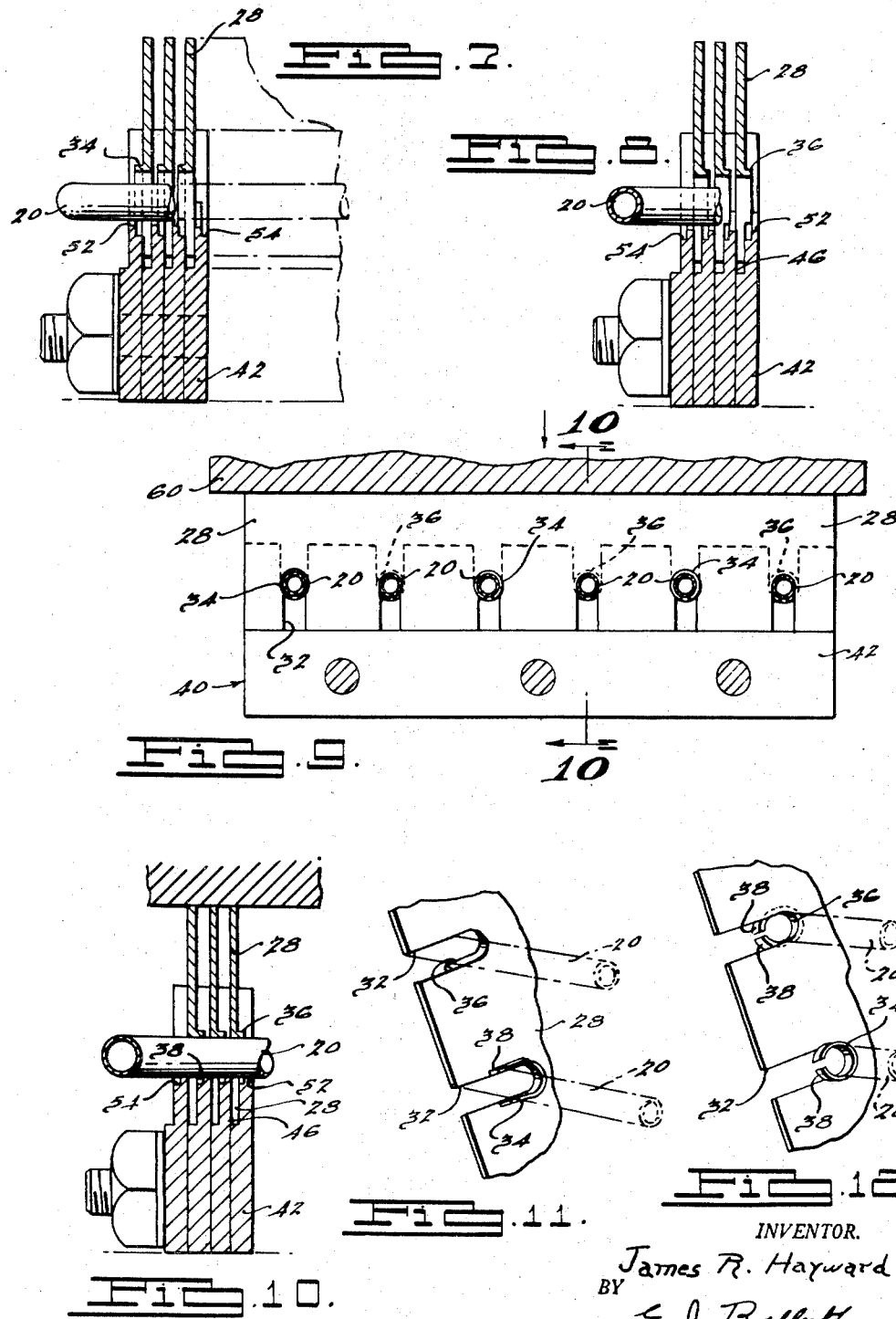

Patented Dec. 5, 1950

2,532,303

UNITED STATES PATENT OFFICE 2,532,303

APPARATUS FOR MAKING FINNED TUBE HEAT EXCHANGERS

James R. Hayward, Washington, Ind., assignor to McCord Corporation, Detroit, Mich., a corporation of Maine Original application November 29, 1945, Serial No. 631,540. Divided and this application February 6, 1948, Serial No. 6,663

10 Claims. (Cl. 153—48)

1

This invention relates to an apparatus for making finnned tube heat exchangers.

More particularly, this invention relates to an apparatus for assembling and securing the fins to the tubing of a side entry fin heat exchanger.

This application is a division of my application Serial No. 631,540, filed November 29, 1945, for "Condenser and Method of and Apparatus for Making the Same."

A principal object of the invention is to provide a new and improved apparatus useful for practicing the method herein disclosed.

Other and further objects of the invention will be apparent from the following description and claims and will be understood by reference to the accompanying drawings, of which there are three sheets, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a condenser made by employing the invention herein disclosed;

Fig. 2 is an enlarged fragmentary elevational view of the condenser;

Fig. 3 is a fragmentary sectional view taken along the line 3—3 of Fig. 2;

Fig. 7 is an enlarged fragmentary sectional view taken in a plane along the line 7—7 of Fig. 5, looking in the direction of the arrows;

Fig. 8 is a fragmentary sectional view taken along the line 8—8 of Fig. 5, looking in the direction of the arrows;

Fig. 9 is a view similar to Fig. 5 but with the fins assembled and secured to the tubing and

Figure 4:
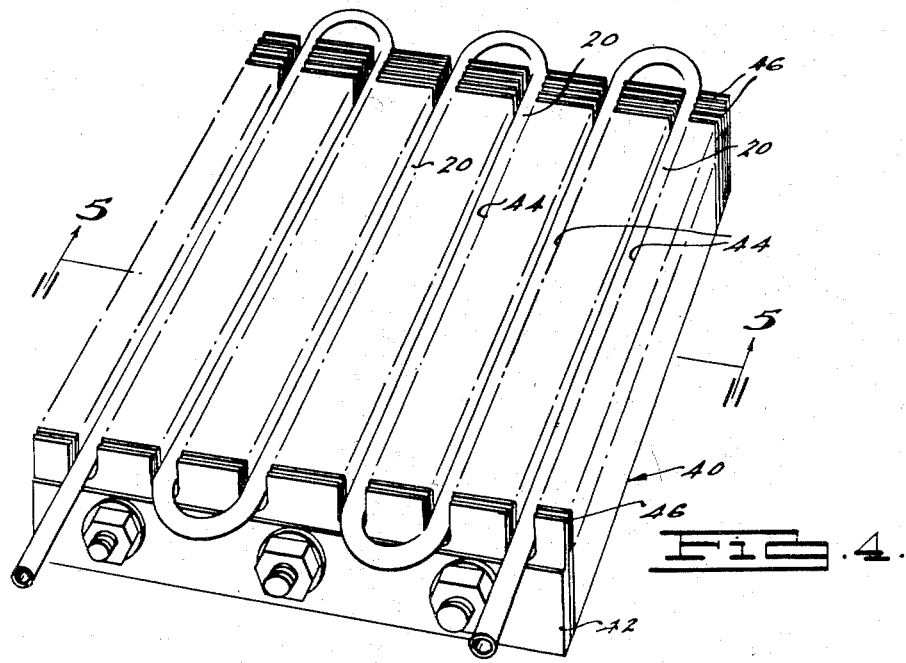
Fig. 4 is a perspective view of a die useful for assembling and securing the fins of the condenser to the tubing thereof and with the tubing positioned in the die.

2 illustrating the final step in the method of securing the fins to the tubing;

Fig. 10 is a fragmentary sectional view along the line 10—10 of Fig. 9;

Fig. 11 is a fragmentary perspective view illustrating the position of a fin relative to the tubing corresponding with the position of the fins and tubing as shown in Figs. 5, 6, 7 and 8; and Fig. 12 is a view similar to Fig. 11, but showing the relative position of a fin when secured to the tubing and corresponding to the position of the fins and tubing as illustrated in Figs. 9 and 10.

A finned tube heat exchanger in the form of a condenser is illustrated in Figs. 1, 2 and 3 and comprises a length of tubing bent into serpentine form to provide a series of parallel runs 20 connected in series by integral loops 22. One end 24 of the tubing may comprise an inlet for the heat exchanger while the other end 26 may comprise an outlet therefor. In the form shown, it is adapted for use in a refrigerating system for liquifying the compressed refrigerant and is adapted to be exposed to air so as to permit the circulation of air thereover under either natural or forced draft.

The tubing employed is round in cross-section and may be made of copper, steel or other suitable material useful in a heat exchanger. The tubing has secured to it a series of fins 28, each fin comprising a flat strip of metal or other suitable material, which along one side edge 30 thereof is provided with a series of slots 32, the number of slots 32 and the spacing thereof corresponding with that of the runs 20 of the tubing. The fins 28 are formed from sheet or strip material by suitable dies so as to provide the slots 32 as well as the slot flanges 34 and 36.

The flanges 34 and 35 as formed project laterally from the faces of the fin 28, the flanges 34 projecting in one direction while the flanges 36 project in the opposite direction. It will be observed that the flanges 34 and 36 are formed only around part of the slot, namely, the bottom part thereof, although it will be apparent that with a narrower fin, the flanges 34 and 36 might extend throughout the entire extend thereof. As initially formed in the fin, the flanges 34 and 36 are in the form of a U and are arranged at the sides of the slots 32 and the fins 28. The flanges 34 and 36 form troughs or seats for the tubing as clearly illustrated in Figs. 3 and 12, and function to provide a good joint by means of which the tubing may be secured to the fins 28 in heat exchange relationship therewith.

The tubing employed may be solder coated so that after the fins 28 are arranged thereon as illustrated in Figs. 3 and 12, the solder coating on the tubing may be melted in a brazing operation so as to integrally unite the tubing to the fins so that the fins will function as efficient heat transfer surface for the tubing. Instead of integrally uniting the fins and the flanges thereof to the tubing by a brazing operation, any other suitable method may be employed.

As stated, the bottom of the flanges 34 and 36 form seats or troughs for seating the tubing while the ends 38 of the flanges 34 and 36 are separated from the fins and form tabs which are curled or deflected over the tubing on the open side of the slot so as to locate the runs 20 of the tubing in the seats provided in the bottom of the slots 32 as clearly illustrated in Figs. 3 and 12. In this manner, the tubing is firmly secured relative to each of the fins and in addition the flanges 34 and 36 provide a good heat transfer joint between the tubing and the fins proper 28. The width of the slots 32 closely approximates the outside diameter of the tubing. The arrangement of the flanges 34 and 36 functions to arrange the fins 28 normal to the runs 20 during the assembling operation of the fins to the tubing and also after the assembling is completed so that the fins 28 will be arranged substantially parallel to each other.

Figure 5:
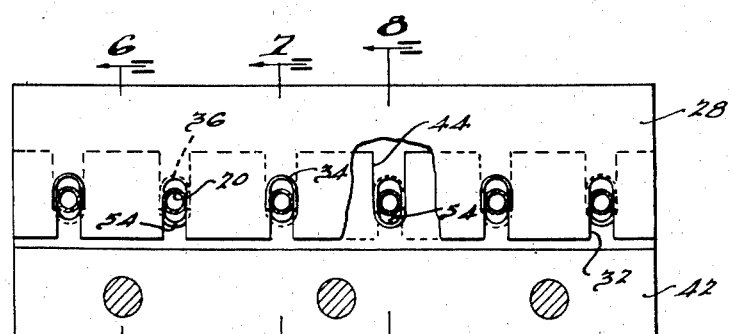
Fig. 5 is a sectional view through the die taken generally along the line 5—5 of Fig. 4 but with a fin positioned in the die, and illustrating one step in the method of assembling and securing the fins to the tubing.
Figure 6:
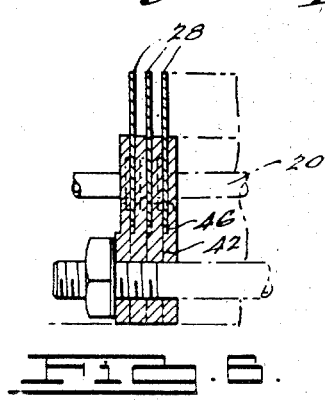
Fig. 6 is a fragmentary sectional view taken in the plane along the line 6—6 of Fig. 5, looking in the direction of the arrows.

In Figs. 4 to 10, a die indicated generally at 40 useful in assembling the fins to the tubing is illustrated. This die as illustrated comprises a series of plates 42 bolted together and formed to provide a series of slots 44 for receiving the runs 20 of the tubing and a transverse series of slots 46 for receiving the fins 28, each slot being adapted to accommodate a fin 28. The die 40 may be arranged with the slots 44 and 46 facing upwardly and the tubing arranged in serpentine form is then positioned in the die as illustrated in Fig. 4. At this time the tubing may or may not be located in the bottom of the slots 44. The die 40 forms a nest for a stack of fins 28 and after the tubing is arranged in the die 40 as illustrated in Fig. 4, the fins 28 may be inserted in the die, one in each of the slots 46 with the open side of the slots 32 in the fins 28 presented toward the tubing so that each fin will straddle the tubing as shown in Fig. 5. The slots 46 in the die position the fins 28 parallel to each other, as shown in Figs. 6, 7, 8 and 10.

The bottom of the slots 44 in each plate or part 42 of the die 40 is provided with two surfaces, namely, a surface 52 in the form of a U, the bottom of which has a radius corresponding with that of the tubing employed, and a surface 54 shaped and sized to receive the ends 38 of the flanges 34 and 36, the radius of the surface 54 being greater than that of the bottom of the surface 52, but formed on the same center and with the difference in radius being equal to the thickness of the metal of the flanges 34 and 36.

Upon reference to Figs. 7 and 8, it will be noted that the plates 42 of the die are formed so that the slot 44 defining portions thereof are alternately formed to correspond with the alternating arrangement of the flanges 34 and 36, in the case of Fig. 7, one of the slot defining portions having the portion 54 thereof on the right so as to receive the flanges 34, while in Fig. 8 the slot defining portions 54 are on the left so as to receive the flanges 36. The flanges 34 and 36 project from the face of the fins a distance which is approximately half of the thickness of the upper portions of the plates or parts 42 of the die.

The slots 46 are slightly wider than the thickness of the metal stock of which the fins 28 are formed so that the slots 46 will freely accommodate the fins and permit the ready separation of the fin and tube assembly from the die after the fins are secured to the tubing as illustrated in Fig. 10.

With the die 40 having a coil of tubing and a stack of fins therein as illustrated in Fig. 5, the same may be arranged in a press so that the stack of fins 28 may be fully and completely pressed into the tubing. In Figs. 9 and 10, a ram 60 of a press is illustrated as applying pressure downwardly on the stack of the fins 28, the die 40 being fixed so that the fins 28 will be pressed downwardly into the die so as to seat the closed ends of the flanges 34 and 36 on the runs 20 of the tubing. During this operation, the fins 28 will move relative to the tubing so that the tubing will be seated in the fins or troughs of the flanges 34 and 36 as shown in Figs. 10 and 12. The fins 28 will also be driven downwardly into the slots 46 and during this downward movement of the fins in the slots 46, the portions 54 of the slots 44 of the die 40 will receive the ends 38 of the flanges 34 and 36 and peel the same away from the fin and curl the edges 38 toward each other and around the tubing 20 on the open side of the slot 32 so that the ends 38 will clamp the tubing in the seats therefor provided by the flanges 34 and 36, the final relative position of the parts being shown in Fig. 12.

After the ram 60 is raised, the fin and tube assembly may be removed from the die 40 by lifting the same vertically relative to the die when the die is arranged with the slots therein facing upwardly. Thereafter, the fin and tube assembly may be subjected to the brazing operation previously described to integrally unite the flanges 34 and 36 to the tubing.

When each fin is made, slits are made between such fin and the ends 38 of the flanges 34 and 36 so as to facilitate folding of such ends 38 around the tubing during the assembly thereof with the fins.

While I have illustrated and described a preferred embodiment of my invention, it is understood that this is capable of modification and I therefore do not wish to be limited to the precise details set forth, but desire to avail myself of such changes and alterations as fall within the purview of the following claims.

I claim:

1. Apparatus for securing a slotted sheet material fin to a round tube extending through the slot in said fin comprising a die having a slot for receiving said tube and a transverse slot for receiving said fin with the tube extending through the slot in said fin, said fin having portions capable of being deflected around the tube, said tube slot in the die having a seat for receiving and holding said tube when the fin is pressed onto said tube and said die having means adjacent the bottom of said tube slot therein for engaging said portions of the fin adjacent the slot and deflecting said portions of said fin around the tube on the open side of said slot when said fin is pressed onto said tube.

2. Apparatus according to claim 1 wherein said means comprises a curved surface in the die adjacent the bottom of said tube slot.

3. Apparatus for securing a slotted sheet material fin to a round tube extending through the slot in said fin and in which said fin is provided with a flange projecting laterally from the edge of said slot comprising a die having a slot for receiving said tube and a transverse slot for receiving said fin with the tube extending through the slot in said fin, said flange having portions capable of being deflected around the tube, said tube slot having a seat for receiving and holding said tube when the fin is pressed onto said tube and said die having means for engaging said portions of said flange and deflecting said portions of said flange around the tube on the open side of said slot when said fin is pressed onto said tube.

4. Apparatus according to claim 3 wherein said means comprises a curved surface in the die adjacent the bottom of said tube slot.

5. Apparatus for securing a slotted fin to a round tube extending through the slot in said fin and in which said fin is provided with a flange projecting laterally from the edge of said slot comprising a die having a slot for receiving said tube and a transverse slot for receiving said fin with the tube extending through the slot in said fin, said tube slot having means for engaging the ends of said flange and deflecting portions thereof around the tube on the open side of said slot.

6. Apparatus for assembling a sheet metal fin having a slot therein onto a round tube so that said tube extends through said slot transversely of said fin and wherein said fin has a flange projecting laterally therefrom along the sides and back of said slot, said apparatus comprising a die having a slot formed inwardly of one edge thereof, said die being of a thickness less than the desired spacing between adjacent fins on said tube, the width of said slot being great enough to receive the exterior width of said flange and the bottom of said slot having a shape corresponding to that of the front of said flange with the ends thereof along the sides of said fin slot closed about the front of a tube, means for supporting a fin and said die in parallel relation and with the flange surface of said fin extending in adjacent and aligned relation with one surface of said die and with said fin slot and said die slot disposed in aligned but opposite relation to one another, said means also being adapted for supporting a tube between said tube slot and said die slot, and means for moving said fin and said die laterally in parallel relation toward one another for moving the ends of said flange into said tube slot and for deforming said ends of said flange about the front of said tube.

7. Apparatus for assembling a sheet metal fin having a slot therein onto a round tube so that said tube extends through said slot transversely of said fin and wherein said fin has a flange projecting laterally therefrom along the sides and back of said slot, said apparatus comprising a die having a slot formed inwardly of one edge thereof, said die being of a thickness less than the desired spacing between adjacent fins on said tube, the width of said slot being approximately equal to the exterior width of said flange and the bottom of said slot having a shape corresponding to that of the front of said flange with the ends thereof along the sides of said fin slot closed about the front of a tube, means for supporting a fin and said die in parallel relation and with the flange surface of said fin extending in adjacent and aligned relation with one surface of said die and with said fin slot and said die slot disposed in aligned but opposite relation to one another, said means also being adapted for supporting a tube between said tube slot and said die slot, and means for moving said fin and said die laterally in parallel relation toward one another for moving the ends of said flange into said tube slot and for deforming said ends of said flange about the front of said tube.

8. Apparatus for assembling a sheet metal fin having a slot therein onto a round tube so that said tube extends through said slot transversely of said fin and wherein said fin has a flange projecting laterally therefrom along the sides and back of said slot, said apparatus comprising a die having a slot formed inwardly of one edge thereof, said die being of a thickness less than the desired spacing between adjacent fins, on said tube, the width of said slot being great enough to receive the exterior width of said flange and the bottom of said slot having a shape corresponding to that of the front of said flange and the front of a tube when the ends of the flange along the sides of said fin slot have been closed about the front of a tube, means for supporting a fin and said die in parallel relation and with the flange surface of said fin extending in adjacent and aligned relation with one surface of said die and with said fin slot and said die slot disposed in aligned but opposite relation to one another, said means also being adapted for supporting a tube between said tube slot and said die slot, and means for moving said fin and said die laterally in parallel relation toward one another for moving the ends of said flange into said tube slot and for deforming said ends of said flange about the front of said tube.

9. Apparatus for assembling sheet metal fins, each having a slot therein, onto a round tube so that said tube extends through said slots transversely of said fins and wherein said fins have flanges projecting laterally therefrom along the sides and back of each of said slots, said apparatus comprising a plurality of dies each having a slot formed inwardly of one edge thereof, each of said dies being of a thickness less than the spacing between two of said fins, the width of said slots being great enough to receive the exterior width of one of said flanges and the bottom of said slots having a shape corresponding to that of the front of said flange with the ends thereof along the sides of said fin slot closed about the front of a tube, means for supporting a plurality of said fins and said dies in parallel relation and with the surface of said fins extending in adjacent and aligned relation with the opposite surfaces of said dies and with said fin slots and said die slots disposed in aligned but opposite relation to one another, said means also being adapted for supporting a tube between said tube slots and said die slots, and means for moving said fins and said dies laterally in parallel relation toward one another for moving the ends of said flanges into said tube slots and for deforming said ends of said flanges about the front of said tube.

10. Apparatus for assembling a sheet metal fin having a slot therein onto a round tube so that said tube extends through said slot transversely of said fin and wherein said fin has a flange projecting laterally therefrom along the sides and back of said slot, said apparatus comprising a die having a slot formed inwardly of one edge thereof, said die being of a thickness less than the spacing between adjacent fins on said tube, the width of said slot being great enough to receive the exterior width of said flange, the bottom of said slot having a shape corresponding to that of the front of said flange with the ends thereof along the sides of said fin slot closed about the front of a tube, means for supporting a tube between said tube slot and said die slot, and means for moving said fin and said die laterally in parallel relation toward one another for moving the ends of said flange into said flange into said tube slot and for deforming said ends of said flange about the front of said tube.

JAMES R. HAYWARD.

REFERENCES CITED

The following references are of record in the file of this patent:

UNITED STATES PATENTS

| Number | Name | Date |
| --- | --- | --- |
| 1,913,175 | Summers | June 6, 1933 |
| 1,955,837 | Scholl | Apr. 24, 1934 |
| 2,170,774 | Fagan | Aug. 22, 1939 |
| 2,181,108 | Przyborowiski | Nov. 21, 1939 |

Certificate of Correction

Patent No. 2,532,303 December 5, 1950

JAMES R. HAYWARD

It is hereby certified that error appears in the printed specification of the above numbered patent requiring correction as follows:

Column 7, line 8, strike out the words "into said flange";

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*